US007007953B1

(12) United States Patent
Cabot

(10) Patent No.: US 7,007,953 B1
(45) Date of Patent: Mar. 7, 2006

(54) MULTIWAY POKER GAME METHOD AND APPARATUS

(76) Inventor: Anthony N. Cabot, 5450 Manteca Cir., Las Vegas, NV (US) 89118

( * ) Notice: Subject to any disclaimer, the term of this patent is extended or adjusted under 35 U.S.C. 154(b) by 849 days.

(21) Appl. No.: 09/654,212

(22) Filed: Sep. 1, 2000

(51) Int. Cl.
*A63F 13/00* (2006.01)

(52) U.S. Cl. ........................................ 273/292; 463/13

(58) Field of Classification Search ................ 273/292, 273/269, 139; 463/13, 12
See application file for complete search history.

(56) References Cited

U.S. PATENT DOCUMENTS

| | | | | |
|---|---|---|---|---|
| 5,704,835 | A * | 1/1998 | Dietz | |
| 5,816,915 | A * | 10/1998 | Kadlic | 463/13 |
| 5,823,873 | A | 10/1998 | Moody | |
| 5,833,536 | A | 11/1998 | Davids et al. | |
| 5,851,148 | A | 12/1998 | Brune et al. | |
| 6,007,066 | A * | 12/1999 | Moody | 273/292 |
| 6,050,568 | A * | 4/2000 | Hachquet | 273/292 |
| 6,062,981 | A | 5/2000 | Luciano, Jr. | |
| 6,098,985 | A * | 8/2000 | Moody | 273/292 |
| 6,220,959 | B1 * | 4/2001 | Holmes, Jr. et al. | |

OTHER PUBLICATIONS

Gibson, Hoyle's Modern Encyclopedia of Card Games, 1974, p. 271.*

* cited by examiner

*Primary Examiner*—Nini F. Legesse
(74) *Attorney, Agent, or Firm*—Victor J. Gallo

(57) ABSTRACT

Disclosed herein is an apparatus and method for playing a poker game. More particularly, a poker game is presented including a N×N array of cards. At least one group of N cards in the N×N array includes a payline associated therewith. Not unlike standard draw poker, if a winning hand outcome occurs on the payline(s), the player is paid according to a pay table. Both video and manual versions of the game are presented.

18 Claims, 6 Drawing Sheets

MULTIWAY POKER GAME METHOD AND APPARATUS

BACKGROUND OF THE INVENTION

1. Field of the Invention

The present invention relates generally to games of chance. More particularly, the present invention relates to an apparatus and method for a N×N array poker card game.

2. The Prior Art

Both manual and video poker games are known in the art. These games, especially the video variety, garner much player attention at modern casinos. New variations of such games are sought after by casinos to provide additional entertainment and excitement to players.

One such game of late is embodied in U.S. Pat. No. 5,823,873 to Moody. This video five card draw poker hybrid game presents two to three possible poker hands to a player. The player makes a wager on each row of cards. One row of five cards is dealt all face up. The player selects which of the five face up cards are to be held. Those held cards are then duplicated into the remaining hands. Replacement cards for the non-held cards are then dealt to the face up hand. Additional cards are also dealt to the other rows so that each row has five cards. The poker hand ranking for each row of cards is then determined and the player is paid for any winning hands based on a pay table and the amount of the player's wager.

Others have likewise attempted variations of draw poker to entice more play with varying degrees of success. Clearly, from the attraction of the variety of video poker games in modern casinos, players seem to want more from draw poker than just the old fashioned draw poker. However, prior art games are limited to but a few hands to wager on and the propagation of the same "hold" cards throughout the various hands. With casinos demanding ever more "exciting" games, additional games are still needed to provide the players with the variations necessary to continue their entertainment.

BRIEF DESCRIPTION OF THE INVENTION

To overcome these and other shortcomings of the prior art, disclosed herein is an apparatus and method for playing draw poker. More particularly, the present invention provides a multiline draw poker game. The game may be conducted manually, by way of the modern video poker game machine, or via a network such as the internet, a wide area network, or the internet.

The multiway poker game is a draw poker game utilizing, preferably, one standard deck of 52 cards and may utilize more than one standard deck of 52 cards. The player plays against a pay table. The pay table indicates the outcomes that must occur in a final hand presentation for a player to win.

The game is played, preferably, by arranging 25 cards in five rows and five columns. Alternately, the game can be played with nine cards arranged in three rows and three columns.

In the 25-card arrangement, the player has the option of wagering on one to 12 different paylines. That is, in a 5×5 array, five rows of cards are available as paylines, five columns of cards are available as paylines, and two diagonal sets of five cards are available as paylines. Zigzag lines may be optionally allowed thereby increasing the number of paylines, but are not preferred since straight lines tend to be less confusing to players.

The player can bet on any number of the lines from one through 12, but the order in which the lines may be purchased may be limited to a predefined order. That is, due to the arrangement of cards and the correlation between certain cards, for example the center card, and multiple possible paylines, the lesser attractive paylines may be required to be selected before the more attractive center and diagonal paylines. Since certain lines are likely to be more desirable to the player, this approach will require the player to wager more money to obtain the more attractive lines. Thus, if a player only wishes to play or wager on one line of cards, the player may be limited to only the top row of cards. Likewise, if a player wanted to play 10 but not all 12 lines, then the player may not be allowed to play the diagonals. Furthermore, bets on each line may be limited to equal denominations as is common in most casinos.

In the video version of the game, the player selects each line by inserting a coin or token into the machine for each line to be played. Optionally, credits from a credit meter may be used in a like fashion. After selecting the lines to be played, the game is started and a random number generator will generate 50 cards—two for each space on the 5×5 array layout. Alternately, 25 cards may be initially generated, while any non-held cards are replaced by newly generated cards. The first set of cards are then initially displayed on each of the spaces corresponding to the paylines wagered upon by the player.

After the initial set of cards is displayed, the player is given the opportunity to choose which cards are to be held. This is preferably accomplished via a touchscreen display with the player "touching" the cards to be held, but could be accomplished with buttons, a trackball, or other pointing device. When the player has finished selecting the cards to be held, the player will then press a button or area on the touchscreen to direct the game machine to discard the unselected cards and replace them with new cards.

The game then determines the outcome by comparing each line of cards played with a pay table. For each line that produces a winning hand, the game will pay or credit the player with the appropriate payout for the winning combination according to the pay table. For example, a line of cards wagered upon resulting in "3 of a kind" may pay 3 to 1 (or 3 times the amount wagered on that line of cards). Thus, if a player wagered one dollar on that line, then the player would receive three dollars as the payout.

Likewise, a 3×3 version of the game is also disclosed. The 3×3 game is similar to the 5×5 game but includes less or different possible outcomes. For instance, "two pair" and "four of a kind" would not be possible hand outcomes.

A manual version of the game is also disclosed and is played in a manner quite similar to the above. However, the player manually indicates which cards are to be held, and a human dealer handles the dealing of the cards.

Viewed from a first vantage point a method for playing a poker game is disclosed, comprising in combination, dealing, face up, a N×N array of cards, selecting none, some, or all of the cards to be held in the N×N array of a cards, dealing new cards to replace unselected cards; and determining the poker hand rankings of predefined N card arrangements.

Viewed from another vantage point a program storage device readable by a machine, tangibly embodying a program of instructions executable by the machine to perform a method for playing a poker game is disclosed, the method comprising in combination, dealing, face up, a N×N array of cards, selecting none, some, or all of the cards to be held in the N×N array of cards, dealing new cards to replace unselected cards, and determining the poker hand rankings of predefined N card arrangements.

Viewed from yet another vantage point a video poker game machine is disclosed, comprising in combination, means for displaying to a player a N×N array of cards, means activated by the player for selecting some, none, or all of said cards to be held in said array, means for displaying replacement cards for said cards not selected as held in said array, if any, and means for determining the poker hand rankings of predefined N card arrangements.

These and other objects of the present invention will become manifest from the further descriptions and claims of the invention provided herein.

BRIEF DESCRIPTION OF THE DRAWING FIGURES

DETAILED DESCRIPTION OF THE INVENTION

Figure 1:
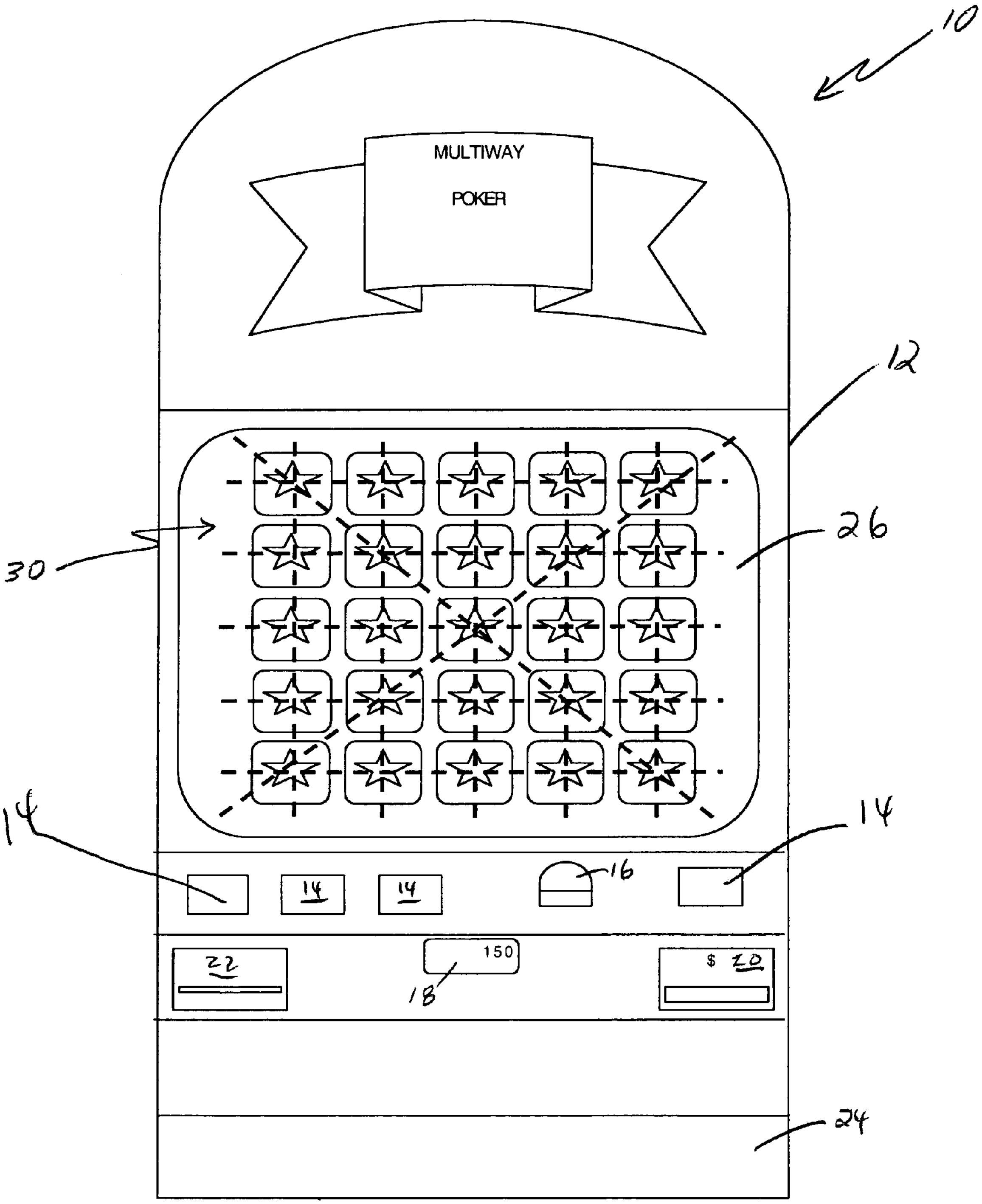
FIG. 1 is a front view drawing of a game machine of the present invention.

Persons of ordinary skill in the art will realize that the following description of the present invention is illustrative only and not in any way limiting. Other embodiments of the invention will readily suggest themselves to such skilled persons having the benefit of this disclosure.

Referring now to the drawing figures wherein like reference numerals denote like parts throughout the various drawing figures, reference numeral 10 is directed to a video poker game machine. The video poker machine 10 includes a cabinet 12 for housing a video display 26, preferably including a touchscreen. Located on cabinet 12 are several features found in traditional video poker gaming machines such as buttons 14 for operating one or more functions of the game, a coin slot 16 for inserting coins into the machine, a credit meter 18 for displaying credits available, a bill validator 20 for receiving cash into the machine, a player tracking card reader 22 for receipt of magnetic stripe player tracking cards, and a coin payout bin 24 for paying out coin winnings to a player. These features are intended to be illustrative only and not intended to be constraining with regard to this invention. Included within the game machine (but not shown) are a processor, memory, and a random number generator, as is common to modern video game machines. The game code is maintained within the memory which is operatively coupled to the processor. The random number generator, required for most jurisdictions, is operatively coupled to said processor as well.

More importantly, displayed on video display 26 is a N×N array of cards 30 face down. In this particular drawing figure, the array is 5×5. Also shown are possible paylines as dashed lines traversing each horizontal row, each vertical column, and each diagonal of five cards.

In short, the game is played by a player wagering on one or more of the paylines presented and then 25 cards are presented face up from a 52 card deck in the positions of the 5×5 array. The player may then hold some, all, or none of the cards. Those cards not held are discarded and replaced from the deck. The poker hand ranking of each payline wagered upon is determined and winning hands are paid according to a pay table and the amount wagered.

Figure 2:
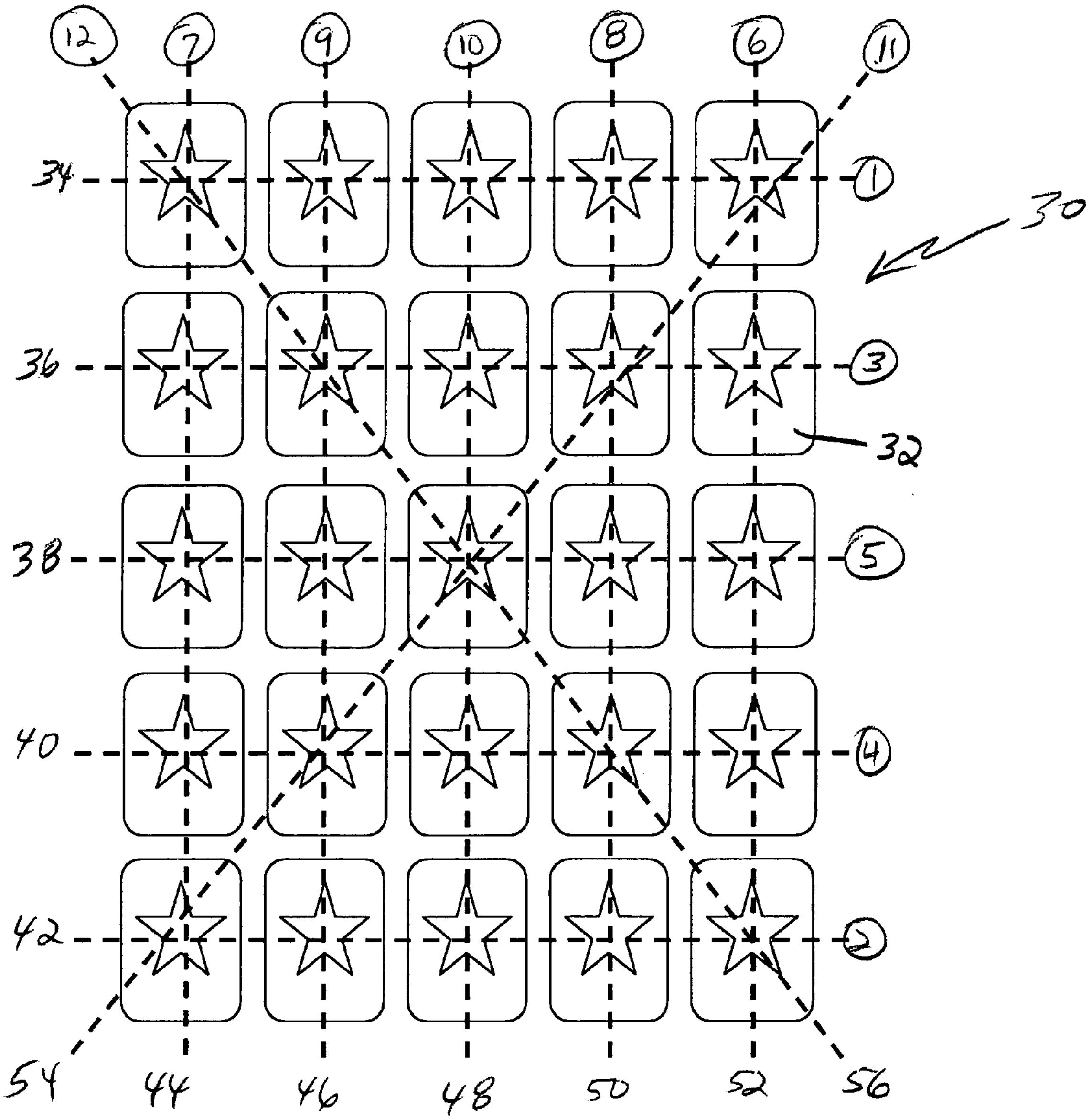
FIG. 2 is a drawing of a 5×5 array of face down cards of the present invention with paylines overlaid thereon of the present invention.

The preferred 5×5 array 30 of cards 32 is further represented in FIG. 2. In FIG. 2, a preferred arrangement of the paylines is depicted. That is, as will be understood from the detailed disclosure of the game provided herein below, certain paylines may be more attractive to a player due to the overlap of cards. Thus, the paylines are preferably arranged so as to require the purchase of less attractive paylines prior to the purchase of the more attractive paylines to encourage the pay and play of more paylines.

Thus, payline 1 is shown at row 34, while payline 2 is shown at row 42, and paylines 3 and 4 are at rows 36 and 40 respectively. Likewise the more attractive payline 5 is at row 38 and could not be purchased without first having purchased the paylines 1 through 4. Similarly, payline 6 is at column 52, payline 7 is at column 44, payline 8 is at column 50, and payline 9 is at column 46. While the more attractive payline 10 is at column 48, which could not be wagered on unless the first nine paylines were wagered on already. The highly attractive and interesting diagonal paylines 11 and 12 are located at diagonals 54 and 56 respectively and would likewise require wagers on the preceding paylines prior to a player being allowed to place a wager thereon.

Figure 3:
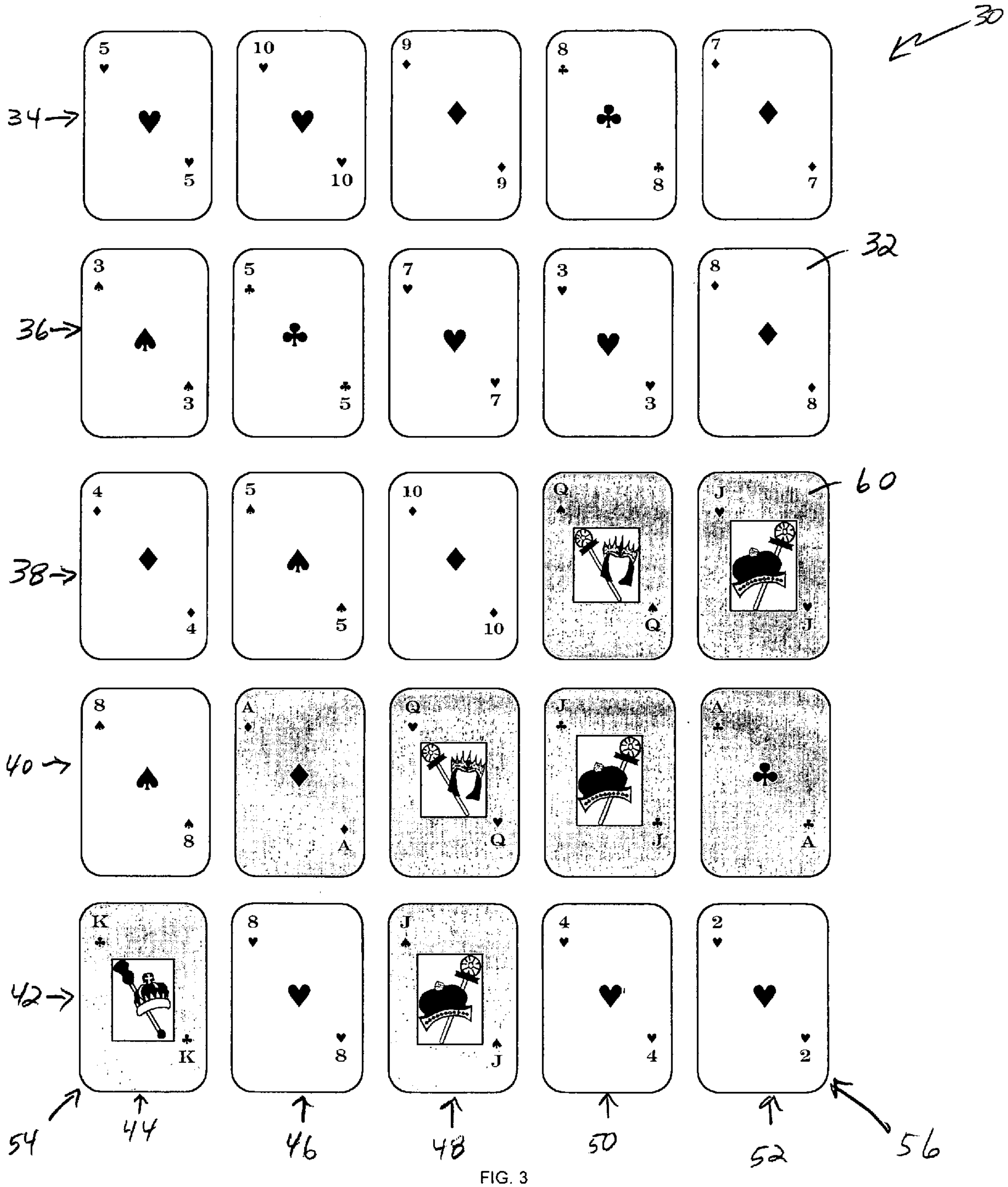
FIG. 3 is an exemplary card hand depiction of the present invention.

For example, and referring now to FIG. 3, after the paylines have been wagered on, the cards 32 are dealt in a 5×5 array 30 as shown in FIG. 3. This example will assume all 12 paylines have been wagered upon. The shaded cards 60 are selected by a player to hold. That is, the queen of spades, the jack of hearts, the ace of diamonds, the queen of hearts, the jack of clubs, the ace of clubs, the king of clubs, and the jack of spades are held. The cards are preferably "held" by "touching" the cards to be held via a touchscreen display 26. Optionally, buttons 14, a trackball, or a pointing device could be configured to allow for the selection of cards to be held or other like means.

Figure 4:
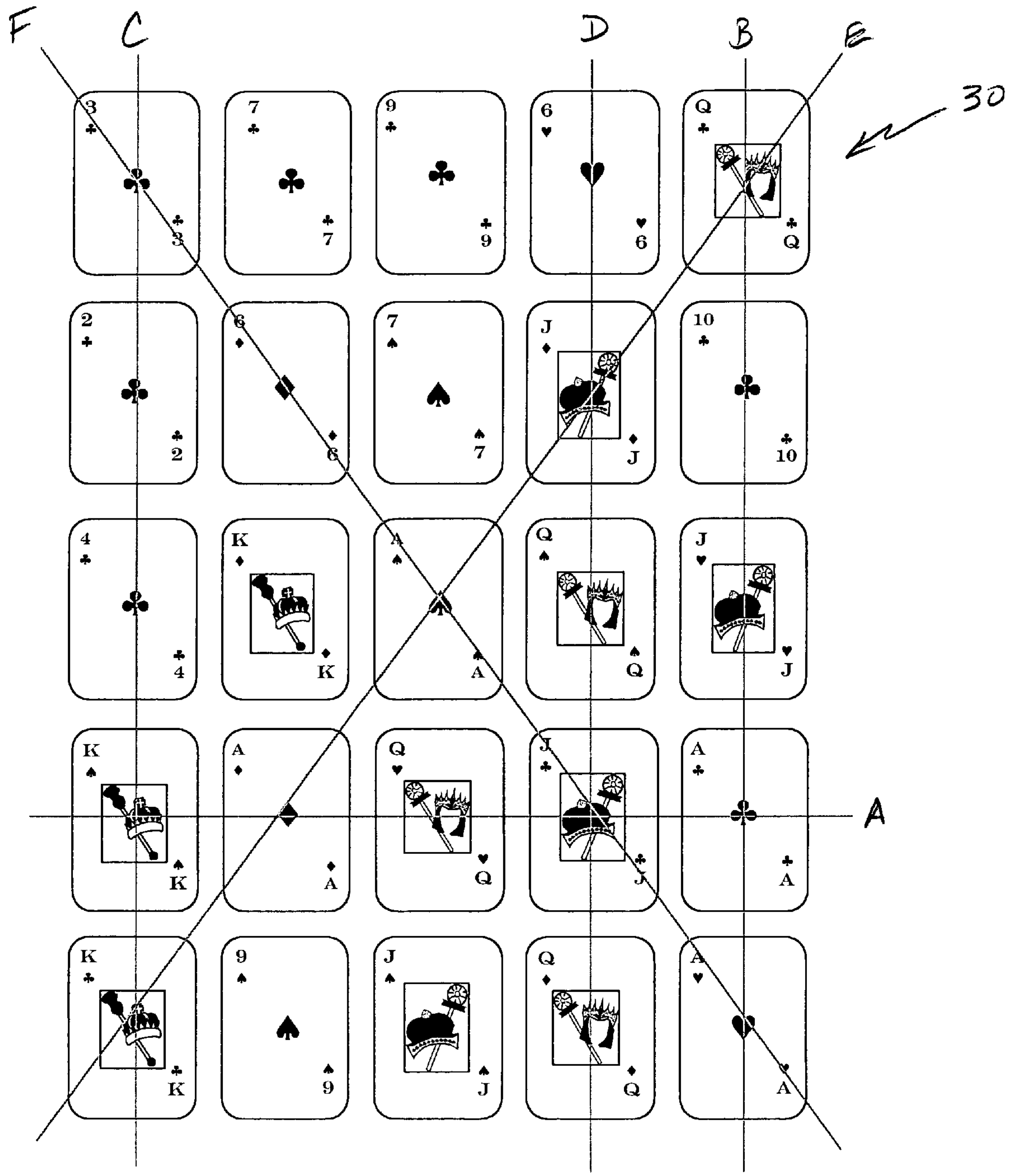
FIG. 4 is an exemplary redrawn hand depiction with winning combination lines shown thereon of the present invention.

The non-held cards are then discarded and replaced with new cards from the remaining cards of the deck as shown in FIG. 4. Each row, column, and diagonal set of five cards is compared to a pay table to determine whether the wager placed on the respective payline should be paid according to the pay table or forfeited. In this example, hands A, B, C, D, E, and F are indicated as winning hands and the player would be paid or credited accordingly. An exemplary pay table is provided at Table 1.

TABLE 1

| HAND | PAYOUT |
|---|---|
| Jacks or Better | 1 to 1 |
| Two Pair | 2 to 1 |
| 3 of a Kind | 3 to 1 |
| Straight | 4 to 1 |
| Flush | 5 to 1 |
| Full House | 7 to 1 |
| 4 of a Kind | 25 to 1 |
| Straight Flush | 50 to 1 |
| Royal Flush | 250 to 1 |

In this example then, hand A which includes a pair of aces would pay 1 to 1. That is, whatever amount was wagered on payline 4, would be returned to the player. Likewise, hand B would be paid in like fashion since it also includes a pair of aces. Hand C, which consists of a pair of kings, would also be paid 1 to 1. While hand D would be paid 2 to 1 for two pair (two jacks and two queens). Hand E, which consists of a pair of aces, would be paid 1 to 1. In total, the player would be paid six credits, assuming the player wagered one credit per each of the 12 paylines (wagered 12 credits).

Certain variations of the game are also contemplated to provide even further excitement. For example, wild cards could be added to the deck making a wild card located in an overlapping payline position quite interesting (a wild card is a card which can be the best possible card needed for the hand in question given the other cards that have been dealt). Another example is to provide the center space of the array as the wild card. That is, if the center space is a five of hearts, it and all other fives are wild. Another example variation is to provide a higher payout on the diagonal lines; thus, further encouraging wagering on all 12 lines. Alternately, the diagonal lines can be associated with a progressive system thereby providing potentially larger jackpots on the diagonal lines. Of course, lesser progressive payouts can be provided in such a system then on the horizontal or vertical lines.

Figure 5A:
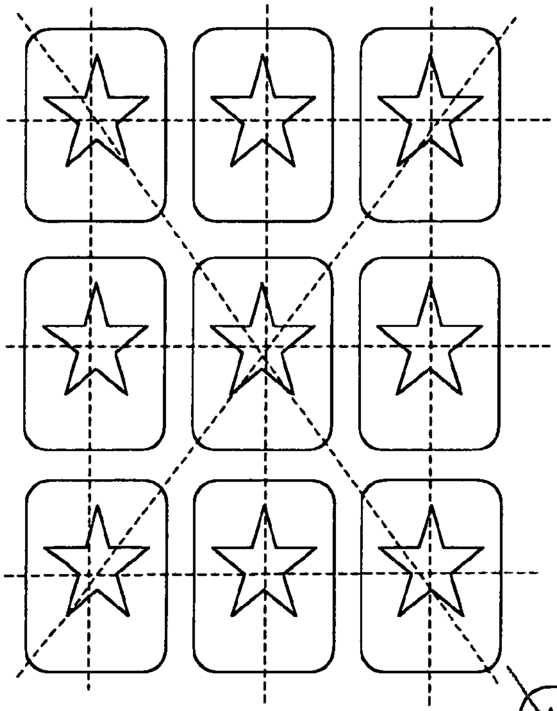
FIG. 5A is a 3×3 version of the present invention with eight paylines indicated thereon.
Figure 5B:
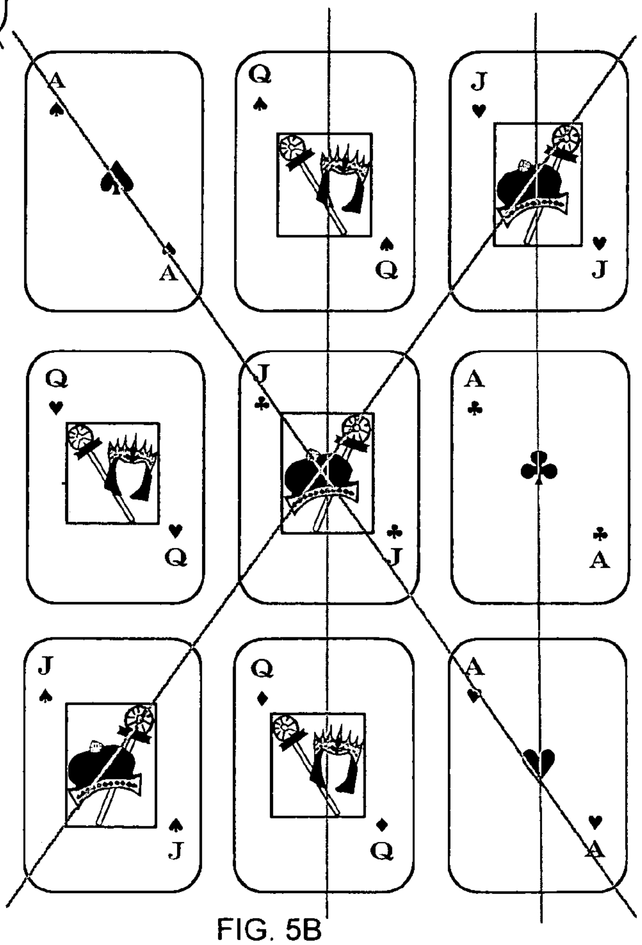
FIG. 5B is an exemplary final game outcome in the 3×3 version of the present invention highlighting possible winning combinations.

In one alternate embodiment, and referring now to FIG. 5A, a 3×3 poker game could be played instead. In fact, any N×N array could be played, however, five card poker is most popular, and three card poker games are somewhat familiar, while other poker games are less well known. Of course in the 3×3 game, certain hands available in a 5 card game would not be possible such as "two pair," "full house," or "four of a kind." An example completed array along with winning highlighted combinations is shown in FIG. 5B. Such a 3×3 array allows for eight potential paylines; three rows, three columns, and two diagonals.

Figure 6:
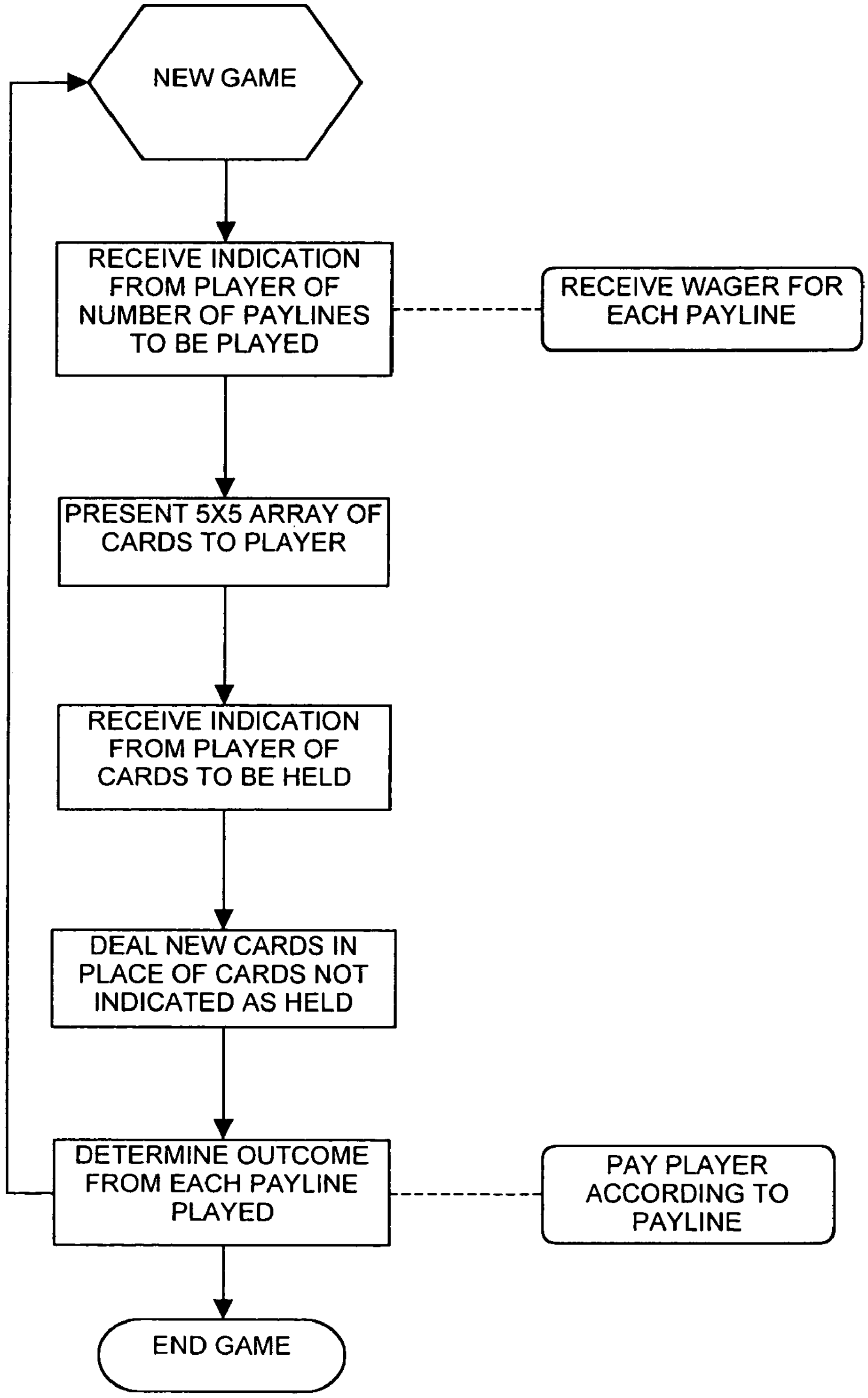
FIG. 6 is a flowchart of the present invention.

As with many poker games, this invention can be played manually as well, with or without wagering. Referring now to FIG. 6, a flowchart of such a manual game is shown. A player must initially choose the paylines to be played (by either placing a wager beside the paylines or indicating to the dealer in some other fashion). Next, the cards are dealt in a N×N array, again preferably a 5×5 array. The player then indicates which cards are to be held. The non-held cards are discarded and replaced with new cards from the deck. The outcome is determined by comparing each of the rankings of the 12 hands to a pay table or game rules to determine win or loss. In the wagering version, winning hands or paylines are paid according to a pay table (which would be available to and presented to the player as needed).

Another alternative is to provide the game code on a host computer and allow players at client devices to play the game. Such a configuration is contemplated for internet online games, networked games within a casino (LAN), and networked games between casinos (WAN). As internet gaming becomes more widespread, and as many traditional casino games are being provided via the internet, to provide the above-described game via the internet or other network is specifically within the scope of this invention.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for playing a poker game, comprising in combination:

dealing, face up, a N×N array of cards;

selecting none, some, or all of the cards to be held in the N×N array of cards of any said cards within said N×N array;

dealing new cards to replace unselected cards within said N×N array;

determining the poker hand rankings of predefined N card arrangements; and wherein said N×N array of cards is a 3×3 array of cards.

2. The poker game method of claim 1 further comprising placing a wager on at least one said N card arrangements prior to the initial dealing of the cards.

3. The poker game method of claim 2 further comprising determining whether said at least one said N card arrangements wagered on includes a winning outcome after determining the poker hand rankings and if so, paying the player according to a pay table.

4. The method for playing the poker game of claim 3 further comprising providing a 52 card deck for dealing and replacing said cards.

5. The poker game method of claim 1 further comprising eight said N card arrangements arranged as three vertical lines, three horizontal lines, and two diagonal lines.

6. The poker game method of claim 5 further comprising allowing the purchase of said eight said N card arrangements sequentially in a predetermined order.

7. The method for playing the poker game of claim 6 further comprising providing a 52 card deck for dealing and replacing said cards.

8. A method for playing a poker game, comprising in combination:

dealing, face up, a N×N array of cards;

selecting none, some, or all of the cards to be held in the N×N array of cards of any said cards within said N×N array;

dealing new cards to replace unselected cards within said N×N array;

determining the poker hand rankings of predefined N card arrangements;

wherein said N×N array of cards is a 5×5 array of cards;

further comprising 12 said N card arrangements arranged as five vertical lines, five horizontal lines, and two diagonal lines; and allowing the purchase of said 12 said N card arrangements sequentially in a predetermined order.

9. The poker game method of claim 8 further comprising determining whether said at least one said N card arrangements purchased includes a winning outcome after determining the poker hand rankings and if so, paying the player according to a pay table.

10. A method for playing a poker game, comprising in combination:

dealing, face up, a N×N array of cards;

selecting some, none, or all of any of the cards within said N×N array of cards to be held;

replacing unselected cards with new cards;

determining the poker hand rankings of predefined N card arrangements wherein any said card is implicated in at least two N card arrangements of hands;

wagering on one or more said N card arrangements prior to said dealing step;

comparing said determined poker hand rankings to a pay table and paying a multiple of said wager according to a payout schedule in said pay table;

providing a 52 card deck for dealing and replacing said cards; and defining N as three and including at least each three card row and each three card column in said predefined N card arrangements.

11. The method for playing the poker game of claim 10 further including at least said three card diagonal groups of cards in said predefined N card arrangements.

12. A method for playing a poker game utilizing a standard 52 card playing deck, comprising in combination:

dealing 25 cards face up in a five row by five column arrangement;

permitting a player to hold none some or all of any of said 25 cards;

replacing each card not held with a card from the remaining cards in the deck;

comparing each five card row and column group of cards to predefined poker rules to determine ten hand rankings;

additionally comparing two diagonal five card groups extending one from a near top corner to a far bottom corner of said five row by five column arrangement of cards and another from a far top corner to a near bottom corner of said five row by five column arrangement of cards to predefined poker rules to determine an additional two hand rankings; and receiving a wager from a player for each row, column, or diagonal group of five cards sequentially in a predetermined order prior to dealing said cards.

13. The method for playing the poker game utilizing a standard 52 card playing deck of claim 12 further comprising paying the player according to a pay table as related to said hand rankings and said wager.

14. A method for playing a poker game, comprising in combination:

dealing, face up, a N×N array of cards;

selecting some, none, or all of any of the cards within said N×N array of cards to be held;

replacing unselected cards with new cards;

determining the poker hand rankings of predefined N card arrangements wherein any said card is implicated in at least two N card arrangements of hands; and defining N as three and including at least each three card row and each three card column in said predefined N card arrangements.

15. The method for playing the poker game of claim 14 further including at least said three card diagonal groups of cards in said predefined N card arrangements.

16. The method for playing the poker game of claim 14 further comprising wagering on one or more said N arrangements prior to said dealing step.

17. The method for playing the poker game of claim 16 further comprising comparing said determined poker hand rankings to a pay table and paying a multiple of said ay table.

18. The method for playing the poker game of claim 17 further comprising providing a 52 card deck for dealing and replacing said cards.

* * * * *